(12) United States Patent
Tedrick

(10) Patent No.: US 6,370,996 B1
(45) Date of Patent: Apr. 16, 2002

(54) RADIAL ARM SAW SPEED CONTROL CYLINDER

(76) Inventor: John Tedrick, 4937 S. 86th E. Ave., Tulsa, OK (US) 74145

( * ) Notice: Subject to any disclaimer, the term of this patent is extended or adjusted under 35 U.S.C. 154(b) by 0 days.

(21) Appl. No.: 09/650,090

(22) Filed: Aug. 29, 2000

(51) Int. Cl.$^7$ .................................................. B23D 1/16
(52) U.S. Cl. .......................... 83/68; 83/485; 83/DIG. 1
(58) Field of Search .......................... 83/488, 487, 486, 83/485, DIG. 1, 68; 91/401, 422, 440; 92/8, 9, 12, 113

(56) References Cited

U.S. PATENT DOCUMENTS

| | | | | |
|---|---|---|---|---|
| 2,500,321 A | * | 3/1950 | Petersen | |
| 2,773,524 A | * | 12/1956 | Shutz et al. | |
| 2,930,415 A | * | 3/1960 | Cravens | 83/485 |
| 2,989,094 A | * | 6/1961 | Panavas | 83/485 |
| 3,424,061 A | * | 1/1969 | Brooks | |
| 3,447,645 A | * | 6/1969 | Dorner et al. | |
| 4,131,143 A | * | 12/1978 | Mayo | 83/488 |
| 4,526,088 A | * | 7/1985 | Reuschenbach et al. | |
| 4,590,831 A | * | 5/1986 | Brodin | 83/485 |
| 4,830,432 A | * | 5/1989 | Fuhrmann et al. | |
| 4,870,882 A | * | 10/1989 | Faxon, Sr. | 83/488 |
| 5,052,255 A | * | 10/1991 | Gaines | 83/485 |
| 5,138,920 A | * | 8/1992 | Mayfield | 83/485 |
| 5,152,207 A | * | 10/1992 | Mayfield | 83/485 |
| 5,331,875 A | * | 7/1994 | Mayfield | 83/485 |

\* cited by examiner

Primary Examiner—Kenneth E. Peterson
Assistant Examiner—Thomas J Druan, Jr.

(57) ABSTRACT

This invention is primarily a device to help prevent inadvertent carriage travel while using a radial arm saw and to facilitate feed speed control of the saw carriage, allowing operators with limited experience to use the saw with greater confidence.

2 Claims, 3 Drawing Sheets

RADIAL ARM SAW SPEED CONTROL CYLINDER

This invention relates generally to tools and more particularly concerns improvements to radial arm saws. Radial arm saws have been in use for many years and have collected a "bad" reputation during this time. My first experience with this saw began in 1947 when I started employment in a large aircraft factory. I hired in as an automotive mechanic and our shop was next to the crating shop where the radial arm saw was located. During evening and midnight shifts the automobile mechanics crated the "must go" shipments. The first day of work the foreman asked if I had used power saws, and I replied "Yes, the band saw and table saw." He said "Good, but don't use the radial arm saw. It's too dangerous." Later the lead carpenter showed me how to use this saw. He cautioned me about sawing too fast on thin lumber (one inch or less). The saw teeth can dig into the board and walk across the board like a race car wheel, and the carriage will violently strike the outboard stops. Even if not injured, you will make every effort to avoid this dangerous situation in the future.

I worked in this area for nine years, and we had one accident on the radial arm saw. While the saw was running a small scrap board fell off a stack and slid into the saw. The blade rode up on top of the scrap and threw it out the back where it ricocheted off the fence and hit one of the carpenters on the arm. It made a small bruise but the man lost no time.

In contrast, during these nine years, three carpenters lost one or more fingers in the table saw.

Deservedly or not the radial saw arm still carries the "bad" reputation.

In 1981 I purchased a radial arm saw for my home shop and used it without incident until 1999. I was sawing 1×12's. My blade wasn't as sharp as it should have been, and one of the boards had a heavy grain running length wise. This combination, while trying to force the cut, caused the saw to climb atop the board and the carriage to strike the outboard stops.

One scare was enough. I decided then and there that I needed a hydraulic cylinder to control the feed speed on my radial arm saw. Thus, necessity is the mother of invention.

It is, therefore, an object of this invention to provide a device which causes travel of a radial arm saw carriage to cease when the operator releases the radial arm saw handle. Another object of this invention is to provide a device which causes travel of a radial arm saw carriage to cease if the operator ceases to pull the radial saw arm handle. A further object of this invention is to provide a device which reduces the possibility of a radial arm saw carriage inadvertently drifting or jumping from its return position due to accidental contact with scrap lumber.

SUMMARY OF THE INVENTION

It is therefore an object of this invention to provide a safety device for the radial arm saw consisting of a valve operated hydraulic cylinder. The spring loaded hydraulic metering valve in conjunction with the operating handle will stop the carriage at any time the handle is released or the operator stops applying a pulling motion on the handle.

The hydraulic cylinder will also keep the carriage in the return position once the operator has moved it there, no drifting, no jumping from accidental contact with scrap lumber.

The adjustable speed feed gives the operator more control of the sawing operation. Once adjusted the operator can apply extra pulling moment on the handle, and the carriage will never exceed the adjusted speed, thus preventing the dreaded kick forward and slamming of the outboard carriage stops.

In some shops the foreman may elect to adjust the feed to a safe speed and lock the adjustment at that position. Thus, the radial arm saw would be a safer and more productive tool.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DETAILED DESCRIPTION OF THE INVENTION

Figure 1:
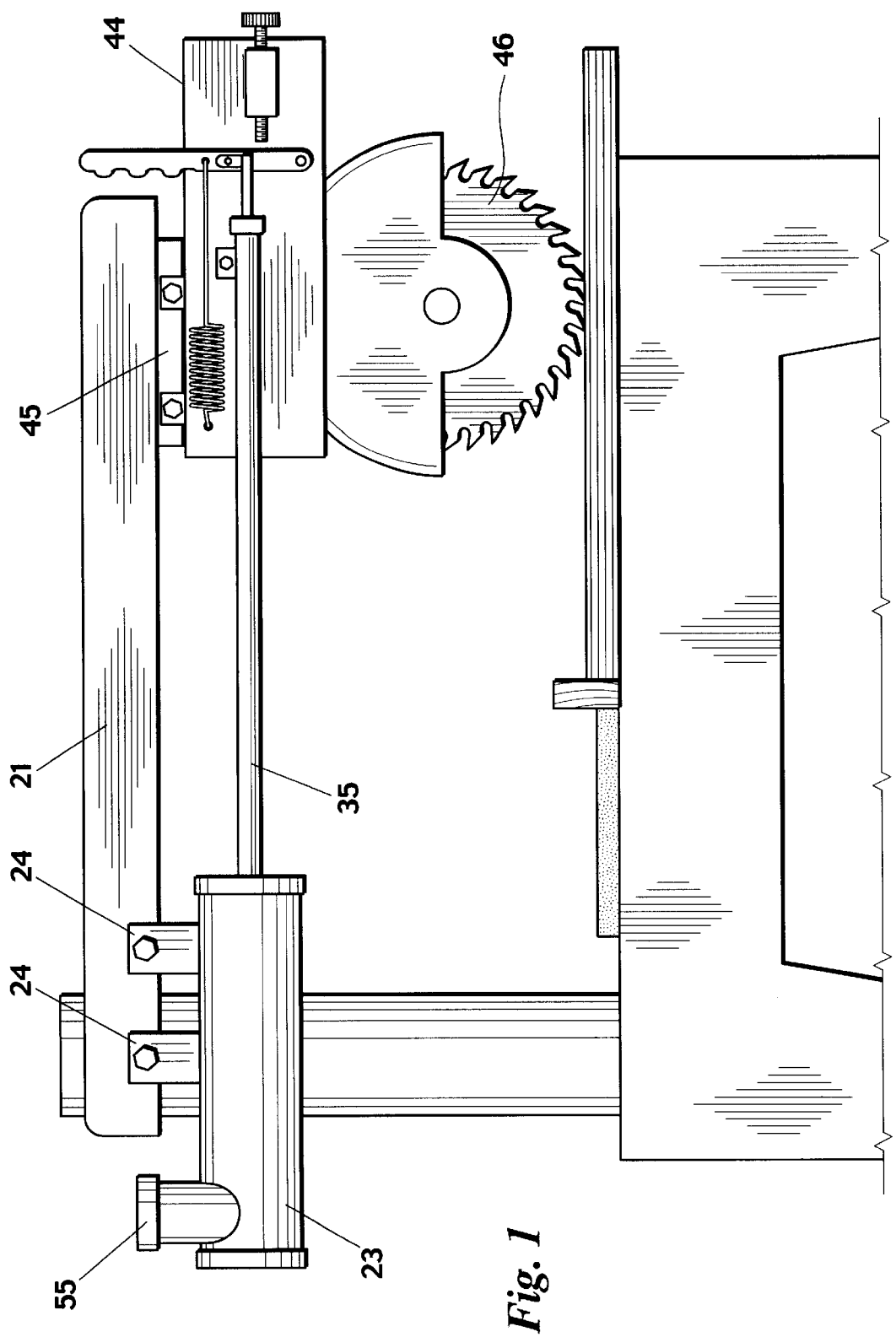
FIG. 1 is a side of the radial arm saw showing the hydraulic cylinder mounted on the radial arm with the operating handle attached to the saw carriage and the saw blade in the extended position.
Figure 2:
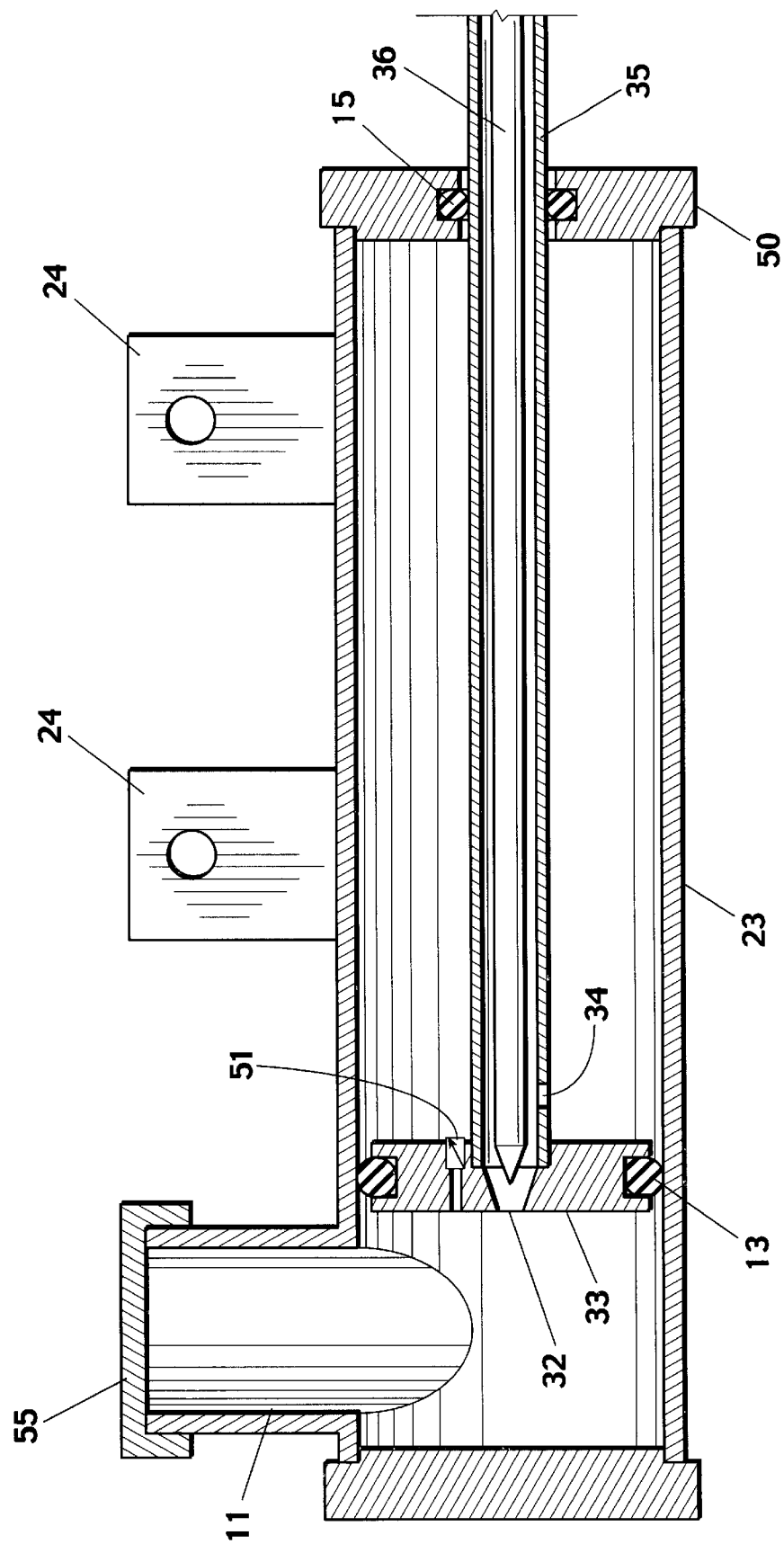
FIG. 2 is a detail cross section view of the hydraulic cylinder.
Figure 3:
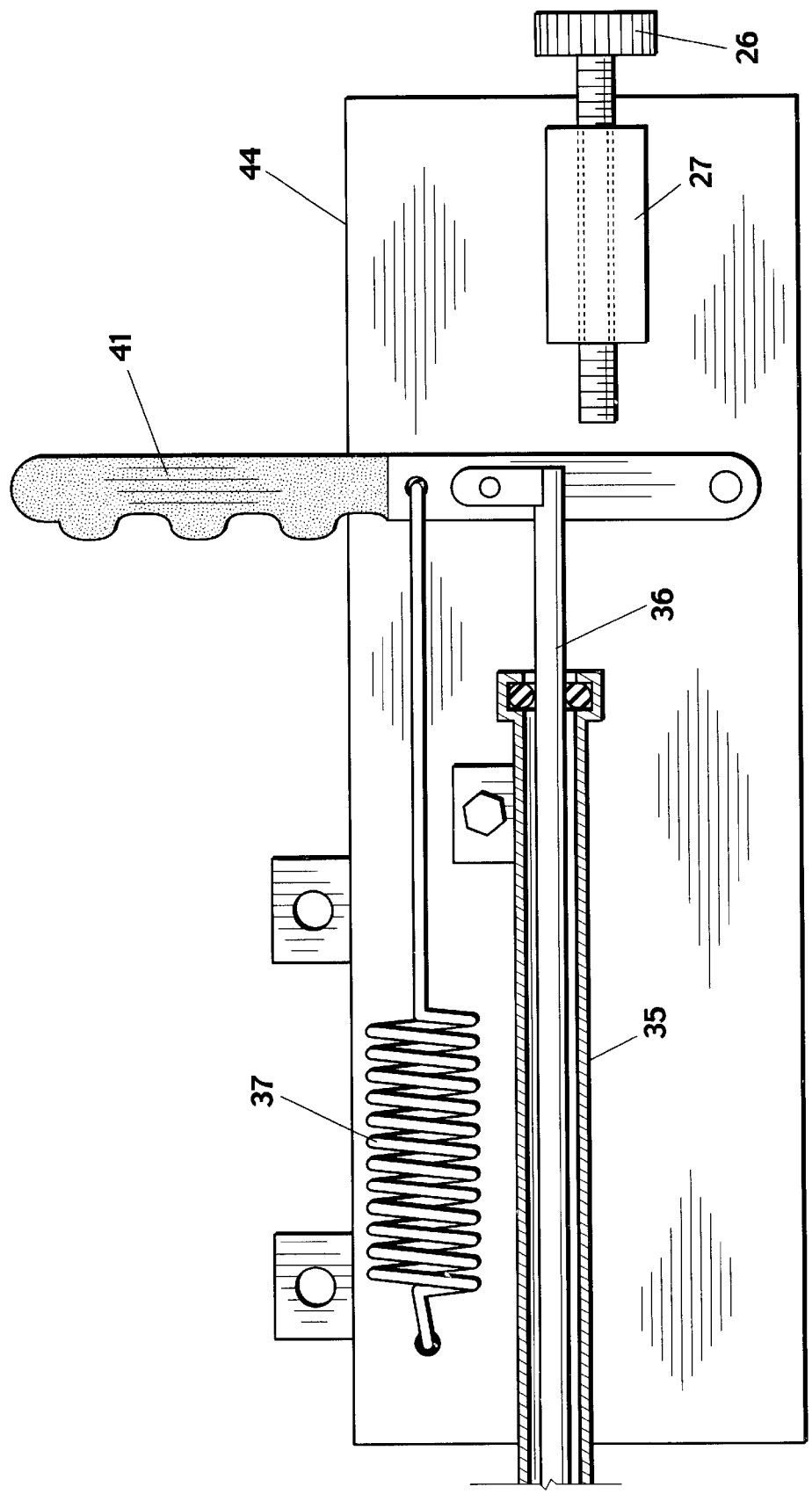
FIG. 3 is a plan view showing the operating handle and its attachments.

FIG. 1 shows the hydraulic cylinder 23 mounted on the radial arm 21 and the operating plate 44 mounted on the saw carriage 45. The saw 46 is shown in the outboard position to illustrate the length of the push tube 35. The outboard stops, are located in the outboard end of the radial arm 21. Looking at FIG. 2, the hydraulic cylinder 23 contains the piston 33 with attached push tube 35. The metering rod 36 is enclosed within the push tube 35. A reservoir 11 with cap 55 is provided. Mounting lugs 24 are shown. 'O' ring seals 13 and 15 are installed on the piston 33, the cylinder end cap 50 and the outboard end of the metering rod 36. A check valve 51 is installed on the piston 33 to allow fluid to move through the piston 33 at any time the carriage 45 is moved to the retracted position. Thus the metering rod 36 and orifice 32 together operate as a metering valve controlling fluid flow and, therefore, travel and feed speed of the lateral arm saw carriage 45. Fluid will move through the opening 34 and orifice 32 whenever outward force is applied to the handle 41 and the saw carriage 45 is advanced toward the extended position. Turning to FIG. 3, a spring 37 is utilized to keep the metering rod 36 retracted into the metering valve orifice 32. A threaded block 27 and thumb screw 26 are provided to limit travel of the handle 41.

What is claimed is:

1. A device for use with a radial arm saw comprising a hydraulic cylinder adapted to be mounted on the radial arm saw, said cylinder having a piston mounted on one end of a hollow push tube therein, said piston having an orifice therethrough in fluid communication with said tube and said tube having a rod slidably extending therein for metering flow of fluid through said orifice, said rod being adapted for connection to an operating handle on a carriage of said saw, and a spring biasing the handle to urge said rod into said orifice whereby a volume of fluid passing through said orifice is varied in response to movement of the handle.

2. A device according to claim 1, further comprising an adjustable thumb screw for limiting travel of the handle away from and said rod out of said orifice.

* * * * *